United States Patent
Lötters et al.

(10) Patent No.: US 10,400,914 B2
(45) Date of Patent: Sep. 3, 2019

(54) FLUID FLOW DEVICE, COMPRISING A VALVE UNIT, AS WELL AS METHOD OF MANUFACTURING THE SAME

(71) Applicant: BERKIN B.V., Ruurlo (NL)

(72) Inventors: Joost Conrad Lötters, Ruurlo (NL); Remco John Wiegerink, Ruurlo (NL); Maarten Sytze Groen, Ruurlo (NL); Dannis Michel Brouwer, Ruurlo (NL); Robert Anton Brookhuis, Ruurlo (NL); Esken Meutstege, Ruurlo (NL); Jarno Groenesteijn, Ruurlo (NL)

(73) Assignee: BERKIN B.V., Ruurlo (NL)

( * ) Notice: Subject to any disclaimer, the term of this patent is extended or adjusted under 35 U.S.C. 154(b) by 0 days.

(21) Appl. No.: 15/573,403

(22) PCT Filed: May 9, 2016

(86) PCT No.: PCT/NL2016/050330
§ 371 (c)(1),
(2) Date: Nov. 10, 2017

(87) PCT Pub. No.: WO2016/182437
PCT Pub. Date: Nov. 17, 2016

(65) Prior Publication Data
US 2018/0128397 A1   May 10, 2018

(30) Foreign Application Priority Data
May 13, 2015   (NL) ..................... 2014801

(51) Int. Cl.
*F16K 31/02*   (2006.01)
*F16K 99/00*   (2006.01)

(52) U.S. Cl.
CPC ...... *F16K 99/0005* (2013.01); *F16K 99/0048* (2013.01); *F16K 2099/0074* (2013.01)

(58) Field of Classification Search
CPC ...................... F16K 99/0005; F16K 99/0048
(Continued)

(56) References Cited

U.S. PATENT DOCUMENTS 4,581,624 A * 4/1986 O'Connor ............... F15C 5/00
                                                    137/831
4,826,131 A * 5/1989 Mikkor ............. F02M 61/1853
                                                    239/585.3

(Continued)

FOREIGN PATENT DOCUMENTS

EP            2530438         12/2012

OTHER PUBLICATIONS

International Search Report and Written Opinion for PCT/NL2016/050330 dated Oct. 20, 2016, 10 pages.

*Primary Examiner* — Minh Q Le
(74) *Attorney, Agent, or Firm* — Casimir Jones, S.C.; Tanya Arenson

(57) ABSTRACT

The invention relates to a fluid flow device (1), comprising a system chip (11) having a substrate (12), a flow channel (21) defined within said substrate, and a sensor unit (41) connected to said flow channel for determining a property of a fluid in said flow channel. Furthermore, a valve unit (30) is provided within said substrate, for regulating fluid flow through said flow channel. The valve unit comprises a valve chamber (31) defined within said substrate, and a valve member (32) that is movably arranged within the valve chamber. The flow channel has a connection channel part (22) defined within said substrate (12), wherein said connection channel part is connected to said valve unit. Further, control means connected to said valve unit and said sensor unit are provided. The control means are arranged for controlling said valve unit based on signals obtained by said sensor unit.

15 Claims, 3 Drawing Sheets

Figure 1:
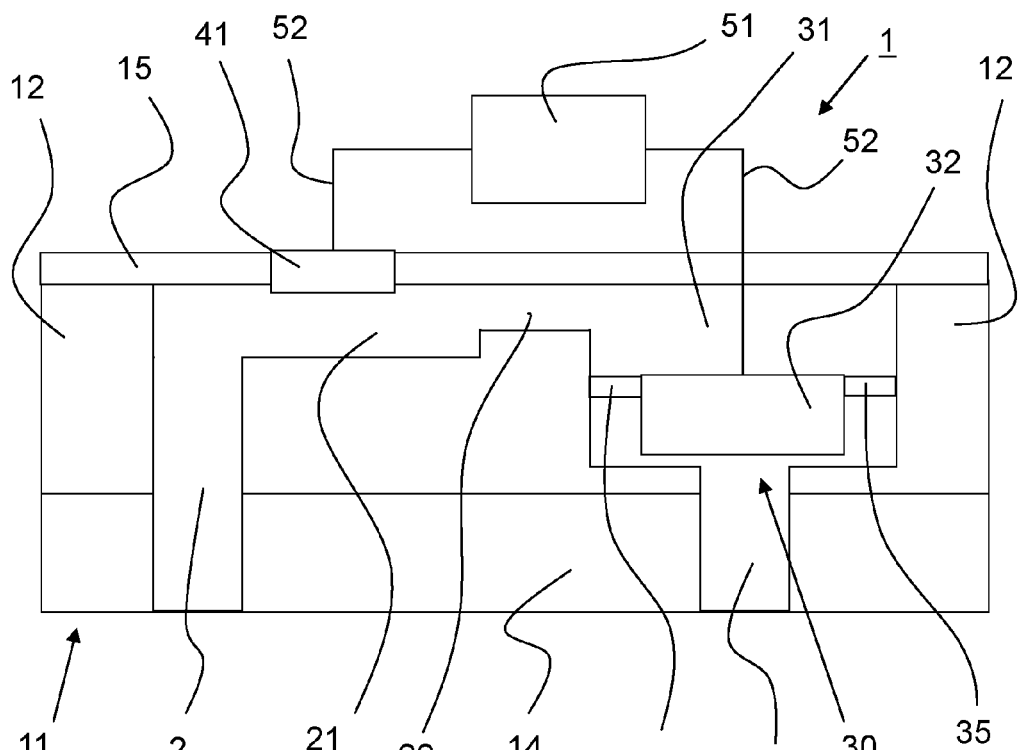

(58) Field of Classification Search
USPC .............................. 137/487.5, 827, 828, 833
See application file for complete search history.

(56) References Cited

U.S. PATENT DOCUMENTS

| | | | |
|---|---|---|---|
| 5,176,358 A | 1/1993 | Bonne et al. | |
| 5,238,223 A * | 8/1993 | Mettner | F15C 5/00 251/129.06 |
| 5,322,258 A * | 6/1994 | Bosch | F15C 5/00 251/129.01 |
| 5,785,295 A * | 7/1998 | Tsai | F15C 5/00 251/11 |
| 6,003,833 A * | 12/1999 | Tasi | F15C 5/00 251/11 |
| 6,182,941 B1 | 2/2001 | Scheurenbrand et al. | |
| 6,240,962 B1 * | 6/2001 | Tai | F15C 5/00 137/852 |
| 6,791,233 B2 * | 9/2004 | Tomonari | F15C 5/00 251/11 |
| 7,011,288 B1 * | 3/2006 | Slicker | F15C 5/00 251/11 |
| 7,192,001 B2 * | 3/2007 | Wise | F15C 5/00 251/11 |
| 7,299,818 B2 * | 11/2007 | Pinter | G01F 1/6842 137/15.18 |
| 7,505,110 B2 * | 3/2009 | Furukawa | F04B 43/043 137/833 |
| 7,892,496 B2 * | 2/2011 | McAvoy | B01L 3/50273 137/341 |
| 10,013,002 B2 * | 7/2018 | Groen | G05D 7/0694 |
| 2004/0075073 A1 * | 4/2004 | Claydon | B81C 1/00492 251/331 |
| 2009/0314368 A1 * | 12/2009 | McAvoy | B01L 3/50273 137/828 |
| 2013/0284956 A1 * | 10/2013 | Kwon | F16K 99/0019 251/65 |

* cited by examiner

FLUID FLOW DEVICE, COMPRISING A VALVE UNIT, AS WELL AS METHOD OF MANUFACTURING THE SAME

The invention relates to a fluid flow device, in particular a fluid flow regulator device, comprising a valve unit, in particular a microvalve, for regulating fluid flow through a flow channel of the fluid flow device.

U.S. Pat. No. 6,182,941 B1 discloses a microvalve. The known device comprises a housing defining a valve chamber, wherein a movable valve member is provided. At a bottom side of the housing a valve seat is provided, and a fluid flow surface area defined by the valve seat and the valve member may be changed, by moving the valve member with respect to the valve seat. The inlet and the outlet for the microvalve are provided at the bottom side of the housing.

It is an object of the invention, to provide a fluid flow device comprising a system chip having a compact design, which is more reliable, and which is relatively easy to produce.

To this end, the invention provides a fluid flow device comprising:
- a system chip having a substrate;
- a flow channel defined within said substrate;
- a sensor unit connected to said flow channel for determining a property of a fluid in said flow channel;
- a valve unit for regulating fluid flow through said flow channel, comprising a valve chamber defined within said substrate, and comprising a valve member that is movably arranged within the valve chamber such that a fluid flow through said flow channel can be regulated, wherein said flow channel has a connection channel part defined within said substrate, wherein said connection channel part is connected to said valve unit; and
- control means connected to said valve unit and said sensor unit, and arranged for controlling said valve unit based on signals obtained by said sensor unit.

According to the invention, the flow channel is provided with a sensor unit connected thereto, and said flow channel has a connection channel part that is provided in the substrate of the system chip and that is directly connected to said valve unit. In other words, according to the invention, the flow channel with the sensor unit has a direct connection to the valve unit, using merely one or more channel parts that are provided within the substrate itself. Due to this design, there is no need for external connection tubes or channels anymore, for connecting the valve unit to the flow channel that has the sensor. As a result, no further manufacturing step, and in particular no additional connection step of one or more external connection lines, is needed. Also, since no external connection lines are needed, there is no risk anymore that these external connection lines fail. Thus, due to the internal connection within the substrate, a more reliable, and compacter fluid flow device is obtained, which additionally is relatively easy to produce. With this, the object of the invention is achieved.

Within the scope of the invention, the term system chip is to be understood as a system on a chip (SoC) or system on chip (SOC), such as a microfluidic system chip or lab on chip, i.e. a chip that integrates substantially all components (including fluid conduits and electronics) of a microfluidic system into a single chip.

Within the scope of the invention, the term substrate is to be understood as a relatively thin slice of material of which the (microfluidic) system chip is made. The material may comprise amongst others silicon, silicon dioxide, aluminum oxide, alloys thereof, and/or polymer materials, for instance SU-8. The substrate is the material in which the fluid conduits of the system chip are defined. The substrate may, in an embodiment, be provided on a carrier, such as an insulator, such that the device comprises a silicon on insulator (SOI) wafer.

Within the scope of the invention, the term flow channel is to be understood as a channel, tube, conduit, or duct capable of transporting fluid. The flow channel may have any desired cross-sectional area, such as round, circular, oval, square, rectangular, triangular, or polygonal. The shape of the flow channel is not limiting for the invention.

Within the scope of the invention, the term sensor unit is to be understood as any unit capable of sensing a property of a fluid flowing through the flow channel. The sensor unit may comprise a flow sensor, such as a Coriolis flow sensor and/or a thermal flow sensor, and/or a pressure sensor.

Within the scope of the invention, the term property of a fluid is to be understood as a property of the fluid flowing through the flow channel, in particular flow velocity, mass flow, and/or pressure. Other properties are conceivable as well, such as temperature, viscosity, density, caloric value, or other physical or chemical properties.

The fluid flow device according to the invention may in particular be a fluid flow regulator device, with which the flow through the flow channel can be regulated and/or controlled by controlling said valve unit based on signals obtained by said sensor unit. In particular, the mass flow and/or the flow velocity of the fluid through the flow channel may be regulated and/or controlled.

Advantageous embodiments of the invention will be explained below.

In an embodiment, the connection channel part extends mainly parallel to the plane defined by the substrate. In this way, a relatively compact device may be manufactured, having in particular a relatively small height dimension.

In an embodiment, the valve chamber is defined by a floor, a circumferential side wall, and a ceiling, wherein the valve chamber comprises an inlet for fluid and an outlet for fluid, wherein at least one of the inlet and the outlet is provided in the side wall of the valve chamber and is connected to the connection channel part. This provides a relatively compact construction. It is conceivable that both the inlet and the outlet are provided in the side wall of the valve chamber, to provide for an even more compact construction.

It is noted that relative terms that are used to denote a specific orientation of the device and/or used to indicate specific directions are not to be interpreted in a limiting way, unless stated otherwise. For instance, the terms floor, side wall and ceiling are not limited to a specific orientation of the device, but are to be construed as relative terms with respect to each other.

It is furthermore noted that the flow path through the device, in particular through the valve unit may in principle be designed in any form. For instance, an inlet may be provided in the floor, and an outlet may be provided in the side wall. Alternatively, the outlet may be provided in the floor, and the inlet may be provided in the side wall. In both cases, the part of the floor surrounding the inlet or outlet, respectively, acts as a valve seat for the valve member. In a specific embodiment of the device according to the invention, at least one inlet and at least one outlet are provided in the side wall.

In an embodiment, the substrate is provided on a carrier, and the floor of the valve chamber is provided near the carrier of the substrate, or the floor may be partly formed by the carrier material. The side wall may extend mainly perpendicular to the carrier. The ceiling may be provided at a distance of the carrier. It is to be understood that the exact form and/or dimensions of the valve chamber are not limiting to the invention. The valve chamber may have, for instance, a cylindrical, square, rectangular, triangular or other geometric shape. In a preferred embodiment, the valve chamber has a cylindrical shape, wherein the radial dimension of the cylinder is larger than the height dimension thereof.

In an embodiment, the valve member is movable in a direction mainly parallel to the side wall of the valve chamber between a closed position and an open position, wherein, in the closed position, the valve member is in contact with the floor of the valve chamber and at least part of the circumferential side wall is positioned at a distance from the valve member. The floor of the valve chamber thus constitutes a valve seat for the valve member. Due to the fact that the valve member is provided at a distance of the side wall, the inlet and/or the outlet can be provided in the side wall, thus providing a flow path from the inlet and/or outlet, past the valve member and valve seat.

The valve member may in an embodiment be movable towards and away from the valve seat, in particular mainly perpendicular to the plane defined by the substrate. However, it is also possible that the valve member is pivotable with respect to the valve seat, or is slidably connected near the valve seat.

The device may comprise an actuator element connected to the valve member and the control means. The actuator element may for instance be a Piezo element, which enables a precise actuator in a compact device. The actuator may be used to control the position of the valve member, to increase or decrease the fluid flow through the valve unit, and to enable more or less flow per time unit to flow through the flow channel connected to the valve unit. It is also possible to hold the valve at a desired position, such that a predetermined fluid flow surface area may be set.

It is conceivable that one of an inlet and an outlet is provided in the floor of the valve chamber, wherein at least the other of the inlet and the outlet is provided in the side wall. In a particularly compact construction, however, the inlet and the outlet of the valve unit are provided in the side wall of the valve chamber.

The valve member may comprise an internal flow channel defined within said valve member, and having a first outer end that faces the floor and having a second outer end facing the side wall. This provides a flow path, defined within the valve member, such that a more compact design is possible.

In an embodiment, the valve unit comprises a flexible flow tube element that extends between the second outer end of the internal flow channel and one of the inlet and/or the outlet provided in the side wall of the valve chamber. The flexible flow tube ensures that the valve member may move within the valve chamber.

In an advantageous embodiment, the valve member is suspended in the valve chamber by means of said flexible flow tube element. Further suspension elements may be provided, to ensure a stable suspension of the valve member. The further suspension elements may be formed by one or more further flexible flow tube elements. It is in this sense conceivable that the valve member is suspended in the valve chamber by means of said one or more flexible flow tube elements only.

In an embodiment, the valve unit comprises at least one further inlet and/or outlet, wherein said at least one further inlet and/or outlet is provided in the side wall of the valve chamber. This allows the valve to be used as a flow node where a plurality of flow paths come together, or where one or more flow paths split up into a larger number of flow paths. For instance, a single flow path may enter the valve chamber via the side wall, and may continue into three flow paths exiting the valve chamber through the side wall, via an internal flow path in the valve member.

The valve chamber has a width dimension as measured in a direction parallel to the plane defined by the floor, and the valve chamber has a height dimension as measured in a direction parallel to the side wall of the valve chamber. Preferably, the height dimension is smaller than the width dimension, such that a compact construction is obtained.

In an embodiment of the fluid flow device according to the invention, the system chip comprises a silicon substrate, and the valve unit comprises a silicon valve member. The flow channel may in this embodiment be a silicon nitride coated channel in the silicon substrate.

In case the flexible flow tube element is used, this flow tube element may be a silicon flow tube, in particular a silicon nitride flow tube.

According to an aspect, a method of manufacturing a fluid flow device according to the invention is provided. The method comprises the steps of:
  providing a substrate;
  realizing the valve chamber, the valve member and the flow channel by means of partially removing substrate;
  fluidly connecting said flow channel and said valve chamber by means of partially removing substrate.

As stated before, rather than using external connection lines, the method according to the invention uses an internal connection, within the substrate, to fluidly connect the valve chamber to the connection channel part of the flow channel that is provided with the sensor. This provides for a more compact and reliable construction.

It is advantageous, when the method comprises partially etching steps.

The manufacturing process may use silicon-on-insulator technology. The substrate may be a silicon layer, the insulating layer may be a buried silicon oxide layer. By using a silicon-on-insulator technology, for instance, it is possible to manufacture a fluid flow device wherein the thickness of the insulating layer, as measured between the base part and the top part, is in between 1 to 10 micrometer, preferably between 3 to 5 micrometer. In total, a device having a diameter of approximately 7.5 mm and a thickness of 0.5 mm may be obtained. It is expected that smaller dimensions, for instance a thickness of the insulating layer smaller than 1 micrometer, are obtainable as well.

Figure 2:
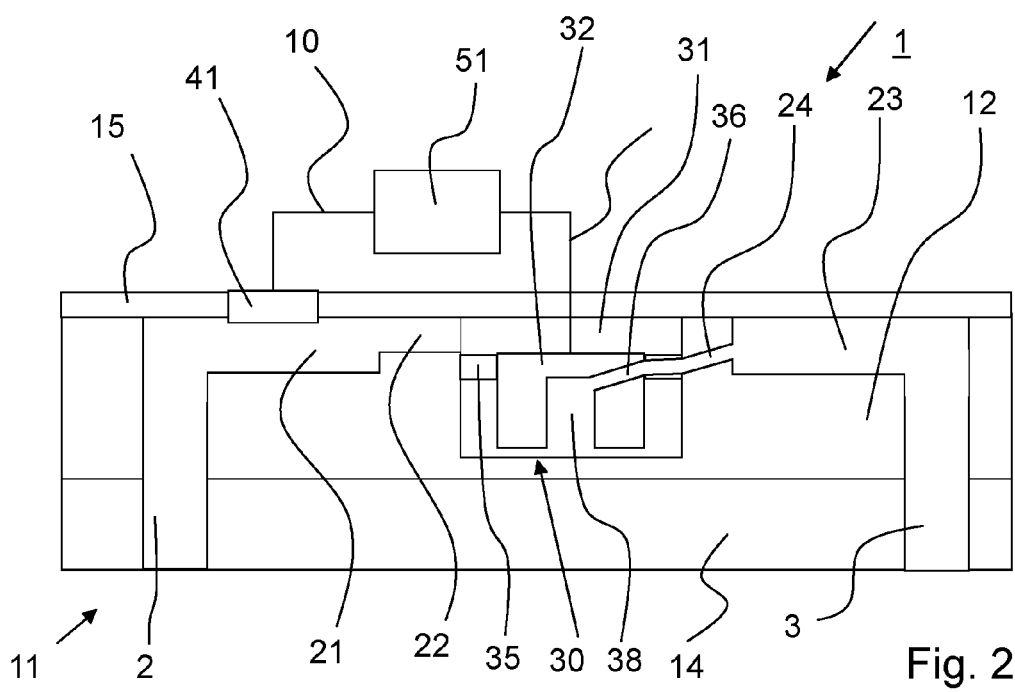
Figure 3:
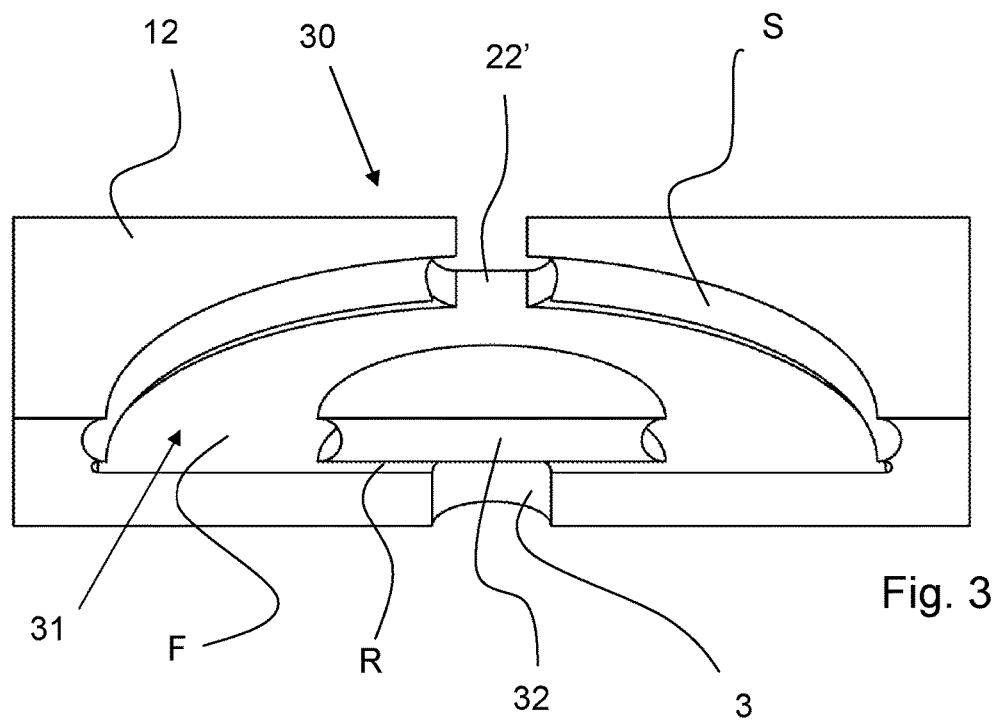
Figure 4:
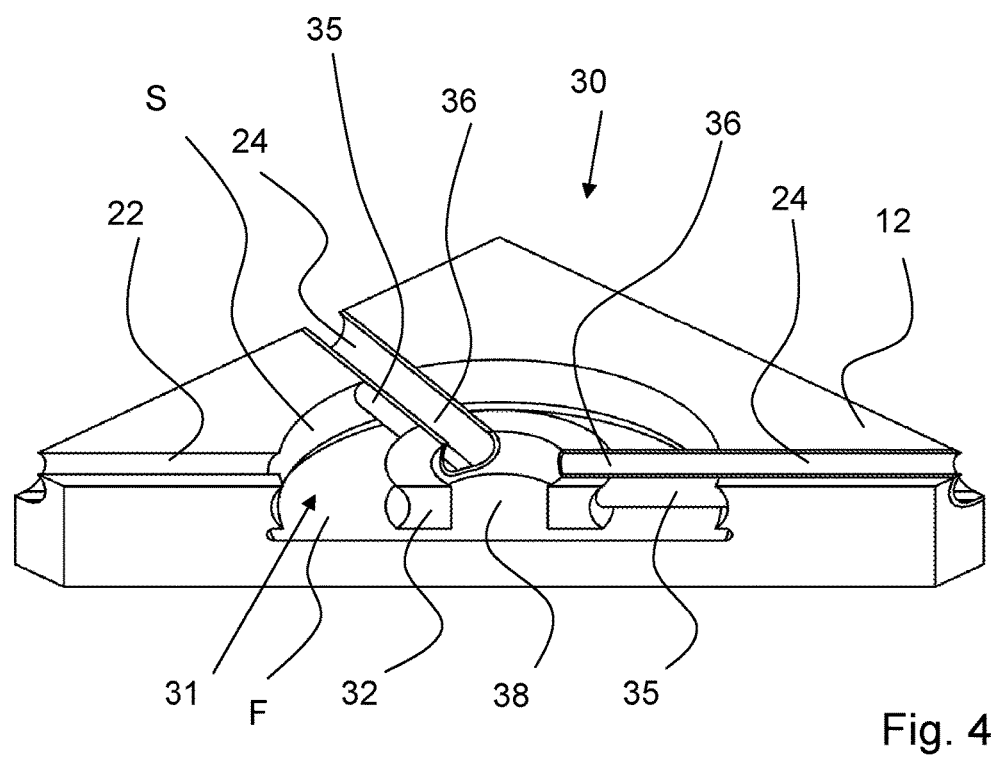

The invention will next be explained by means of the accompanying figures, which show embodiments of the current invention. The embodiments are not intended to be limiting in nature. In the figures:

FIG. 1—schematically shows a cross-sectional view of the fluid flow device according to a first embodiment of the invention;

FIG. 2—schematically shows a cross-sectional view of the fluid flow device according to a second embodiment of the invention;

FIG. 3—shows an isometric view of a valve unit for a fluid flow device according to the first embodiment of the invention as shown in FIG. 1;

FIG. 4—shows an isometric view of a valve unit for a fluid flow device according to the second embodiment of the invention as shown in FIG. 2;

FIG. 5a-e—schematically show cross-sectional views of the various stages during manufacturing a fluid flow device according to the invention;

FIG. 1 schematically shows a cross-sectional view of a fluid flow device 1 according to a first embodiment of the invention. The fluid flow device comprises a system chip 11 having a substrate 12. The substrate is provided on a carrier 14 on one side, and comprises a sealing layer 15 on the other side. In an embodiment the system chip comprises a silicon 12 on a carrier 14 wafer, and the sealing layer may be a nitride membrane with LPCVD nitride. The invention, however, is not limited to the characteristics of the system chip as shown in FIG. 1, however.

As can be seen in FIG. 1, a flow channel 21 is defined within said substrate 12. A sensor unit 41 is connected to said flow channel 21. The sensor unit 41 is arranged for determining a property of a fluid in said flow channel. The sensor unit, which is only schematically shown in FIG. 1, may be a Coriolis flow sensor for determining a mass flow rate of the fluid in the flow channel 21, or for determining the density of the fluid in the flow channel 21. The sensor unit 41 may also be a thermal flow sensor for determining a mass flow rate of the fluid in the flow channel 21, or for determining the temperature of the fluid in the flow channel 21. The skilled person will be familiar with these types of sensor units 41, as well as with the type of properties that can be determined therewith. In particular, the sensor unit 41 may be arranged for determining the mass flow rate of the fluid in the flow channel 21.

In the substrate, there is further provided a valve unit 30. The valve unit is arranged for regulating fluid flow through said flow channel 21. The valve unit 30 comprises a valve chamber 31 that is defined within said substrate 12. The valve unit 30 further comprises a valve member 32 that is movably arranged within the valve chamber 31. The valve member 32 is suspended in the valve chamber 31 by means of flexure elements 35. These flexure elements 35 may be actuator elements, such that the valve member 32 may be moved. With movement of the valve member 32, a fluid flow through said flow channel 21 can be regulated.

The device 1 further comprises control means 51 connected to said valve unit 30 and to said sensor unit 41. The control means 51 may, for instance, be connected to the actuator elements 35 that are formed by the flexure elements 35. Other ways of actuating the valve member are conceivable as well. The control means 51 are indicated as a separate block, but may be integrated in the system chip 11. The control means 51 are arranged for controlling said valve unit 30 based on signals obtained by said sensor unit 41.

According to the invention, the flow channel 21 has a connection channel part 22 defined within said substrate 12, and that directly connects the flow channel 21 to the valve chamber 31 of the valve unit 30. In the embodiment shown, the connection channel part 22 extends mainly parallel to the plane defined by the substrate 12. By having a direct connection between the flow channel and the valve unit, an on-die-integration of both the valve unit 30 and the sensor unit 41 can be made, which eliminates the need of wager bonding steps or fluidic interconnects, and enables the realization of, for example, a proportional mass flow controller on a single chip.

The system chip 11 of FIG. 1 comprises an inlet 2 for fluid, at least partly provided in the carrier layer 14, and leading to the flow channel 21. The inlet 2 extends mainly perpendicular to the plane defined by the substrate 12. An outlet 3 is provided as well. This outlet 3 extends mainly perpendicular to the plane defined by the substrate 12, and is at least partly provided in the carrier layer 14. It is noted that in the embodiment described here, fluid flows through the inlet 2, via the flow channel 21 and the valve unit 30, to the outlet 3. However, a reverse flow is also possible, such that fluid enters the device 1, flows through the valve unit 30, and subsequently through the flow channel 21.

Now referring to FIG. 2, an alternative design of the fluid flow device 1 according to a second embodiment of the invention is shown. Similar features are indicated with the same reference sign. For reasons of conciseness, it will be focused here on the difference with respect to the first embodiment of FIG. 1.

In FIG. 2, the fluid flow device 1 comprises a system chip 11 having a substrate (12), a first flow channel 21 defined within said substrate 12, a sensor unit 41 connected to said flow channel 21 for determining a property of a fluid in said flow channel, and valve unit 30 for regulating fluid flow through said flow channel 21. The valve unit comprises a valve chamber 31 defined within said substrate 12, and a valve member 32 that is movably arranged within the valve chamber 31. The fluid flow device comprises a further, second flow channel 23 defined within said substrate 12. An inlet 2 of the device is connected to the first flow channel 21, and an outlet is connected to the second flow channel 23 (rather than being directly connected to the valve unit 30).

The first flow channel 21 has a connection channel part 22 defined within the substrate 12, and that is connected to the valve chamber 31 of the valve unit 30.

The valve member 32 in FIG. 2 is provided with an internal cavity 38 and an internal flow channel 36 that is at least partly provided within a flexure element 35, and that fluidly connects to a connection channel part 24 of the further, second flow channel 23 defined within said substrate 12.

The design allows the valve unit 30 with its inlet and outlet to be provided completely within the substrate 12, which allows on-die-integration of the valve unit 30 and further components of the system chip 11, such that the need of wafer bonding steps or fluidic interconnects is eliminated. Thus, a fully integrated micro-valve 30 on a system chip 11 is obtained.

The design of FIG. 2 also comprises control means 51 connected to the valve unit 30 and the sensor unit 41, and arranged for controlling said valve unit 30 based on signals obtained by said sensor unit 41. It is noted that the further, second flow channel 23 may be provided with a further sensor unit (not shown). For instance, this allows the fluid flow device to comprise a Coriolis flow sensor and a thermal flow sensor, and a valve unit provided there therebetween.

Furthermore, as indicated before, the inlet 2 and the outlet 3 in the system chip 11 may be provided as shown, or the other way around, such that fluid flows from left to right, or from right to left, respectively.

Now referring to FIG. 3, the design of the valve unit 30 of the fluid flow device as shown in FIG. 1 will be discussed. The design comprises a cylindrical valve chamber 31 defined in the substrate 12, having a floor F, a circumferential side wall S, and a ceiling (not shown). The valve chamber 31 is connected to the outlet 3 of the fluid flow device 1 (see also FIG. 1). The outlet 3 is provided in the floor F. The valve member 32 is movably provided within the valve chamber 31. The part of the floor F that surrounds the opening towards the outlet 3 provides a valve seat for the valve member 32. Due to the cylindrical design of the valve member 32, the valve seat and valve member 32 provide a radial channel therebetween. This is advantageous since it provides desired flow characteristics through the valve unit

30. In the side wall S of the valve chamber 31, an inlet 22' for fluid is provided, which inlet 22 is connected to the connection channel part 22 as shown in FIG. 1.

FIG. 4 shows an alternative design of the micro-valve, corresponding to the valve of FIG. 2, wherein both the inlet 22 and the outlet 24 of the valve unit 30 are provided in the side wall S of the valve chamber. Here, the valve member 32 member comprises an internal flow channel 36, 38 defined within said valve member, and having a first outer end 35 that faces the floor F and having a second outer end 36 facing the side wall S. The valve unit 30 further comprises a hollow flexible flow tube element 35 that extends between the second outer end 36 of the internal flow channel and a connection channel part 24 provided near the side wall S of the valve chamber 31. A different connection channel part 22 is also provided, and leads directly to the valve chamber 31. The connection channel part indicated with reference sign 22 may be an inlet, and the connection channel part indicated with reference sign 24 may be an outlet of the valve unit 30. In the embodiment shown in FIG. 4, the fluid flow device comprises three outlet connection channel parts 24, of which a total of two can be seen. As already stated above, the inlet and the outlet are interchangeable.

For the designs shown in FIGS. 3 and 4, the valve member 32 is movable in a direction mainly parallel to the side wall S of the valve chamber 31, between a closed position and an open position, wherein, in the closed position, the valve member 32 is in contact with the floor F of the valve chamber 31 and at least part of the circumferential side wall S is positioned at a distance from the valve member 31. In both designs (although not visible in FIG. 3) it is preferred when the valve member 31 is suspended in the valve chamber 31 by means of flexible suspension elements, and in FIG. 4 these flexible suspension elements are hollow to provide flexible flow tube elements 35.

FIG. 4 already shows that it is possible to provide at least one further inlet and/or outlet, wherein said at least one further inlet and/or outlet is provided in the side wall S of the valve chamber 31. This is of course also possible for the design shown in FIG. 3. Furthermore, it can be seen that the valve chamber 31 in both designs has a width dimension as measured in a direction parallel to the plane defined by the floor F, and has a height dimension as measured in a direction mainly parallel to the side wall S of the valve chamber 31, wherein the width dimension is larger than the height dimension.

Both valve units 30 described in FIGS. 3 and 4 comprise, in a preferred embodiment, a translating silicon plate 32 with a radial flow channel R between valve plate 32 and valve seat. The out-of-plane design (FIG. 3) places the valve plate 32 directly above a through-wafer fluidic inlet or outlet 3. Moving the valve plate up and down then controls flow through the radial channel R, between the inlet/outlet and a surface channel 22'.

The in-plane design (FIG. 4) allows flow control from one surface channel 22 to another surface channel 24. Similar to the out-of-plane design it comprises a large outer cavity (valve chamber 31) with a valve plate 32 in the center. Fluid flows from a surface channel 22, 24 into the outer cavity 31, and then proceeds through the radial channel R between the valve plate 32 and seat F. Contrary to the out-of-plane design the flow does not exit the substrate 12 of the system chip, but instead flows into an inner cavity 38 inside the valve plate 32. This inner cavity 38 is connected to three 'outflow' surface channels 24, 36 that lead through the valve plate 32, through the outer cavity 31, back to surface channels 24 outside of the valve unit 30.

To obtain a single, symmetric point of actuation, a central plate is added at the center of the inner cavity 38 (not shown). It is preferably connected to the ring of the valve plate 32 by three 'spokes'.

Since flow does not leave the surface channel network, the in-plane design of FIG. 4 allows on-chip routing of flow between several fluidic components. In contrast, the out-of-plane design of FIG. 3 must be placed above a chip inlet/outlet and can regulate flow between that inlet/outlet and other on-chip fluidic components.

FIG. 5*a-e* show a simplified process flow of the fabrication of an embodiment of the invention. A<1 0 0>-oriented silicon on insulator (SOI) wafer is provided, with a 50 μm thick device layer 103, a 400 μm handle layer 101 and a 5 μm buried oxide (BOX) layer 102. First the fluidic inlets 202 and outlets (not yet shown in FIG. 5*a*) are created in the handle layer 101 using deep reactive ion etching (DRIE) of silicon.

The surface channels 203 and cavities 204, 205 are then created in the device layer 103 using isotropic etching of silicon through a silicon nitride slit-pattern mask. By varying the density of this slit pattern, it is possible to create both deep and shallow structures in a single etch step (FIG. 5*b*).

Figure 5:
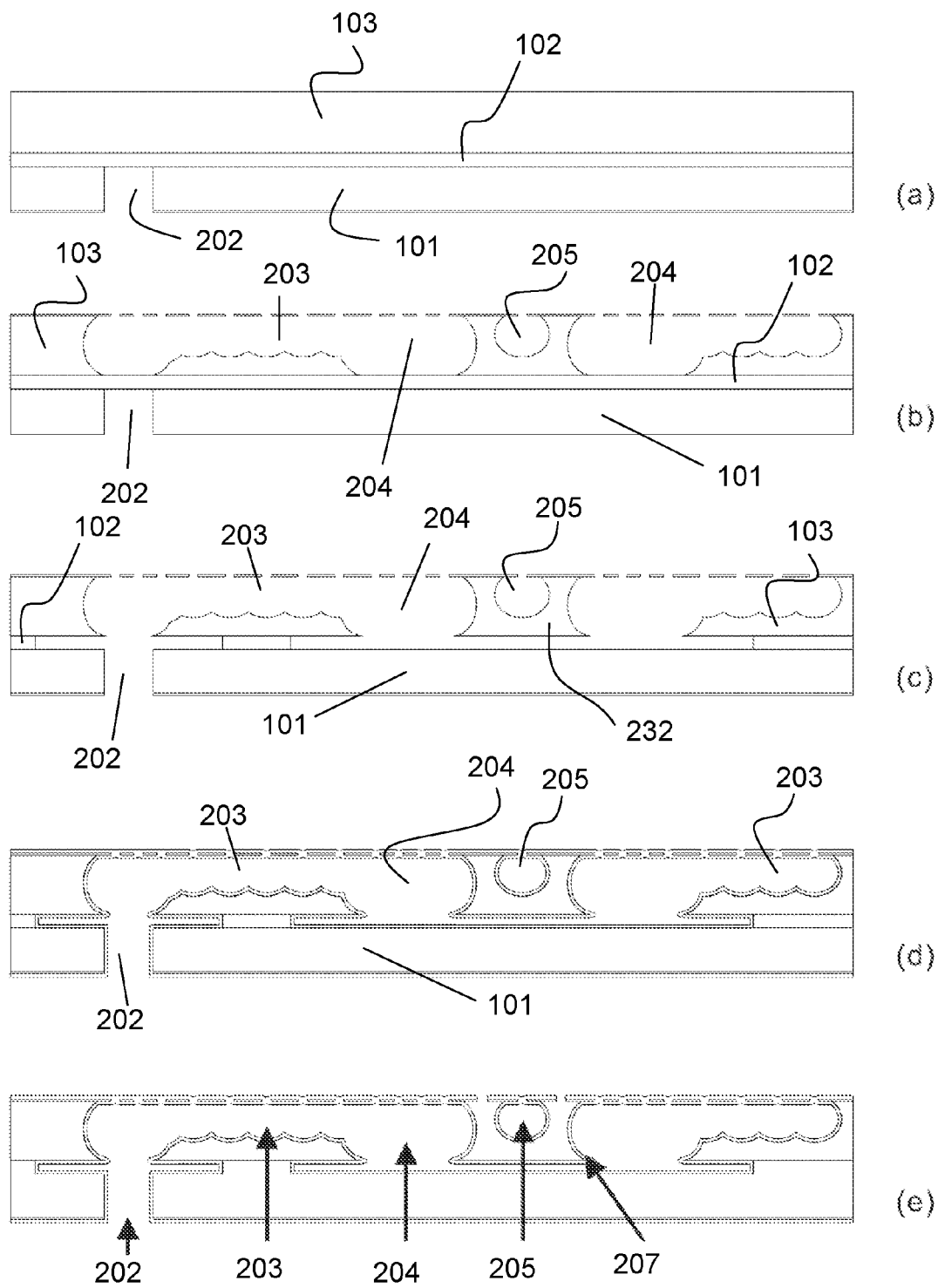

To release the valve structures 232, the BOX layer 102 is selectively etched using first a liquid phase HF etch, followed by a vapor phase HF etch to prevent stiction by capillary forces (FIG. 5*c*).

Using LPCD of silicon nitride, the slit patterns are then closed to seal the surface channels 203, form the channel walls and create a closed fluidic system (FIG. 5*d*).

When the valve is closing, the outflow channels in the in-plane valve need to bend down. To reduce their bending stiffness, the silicon around them is removed in a final isotropic etch (FIG. 5*e*).

It will be apparent to those skilled in the art, that the invention has been described by means of several exemplary embodiments. Further embodiments are conceivable. The desired protection is defined by the attached claims.

The invention claimed is:
1. A fluid flow device, comprising:
a system chip having a substrate;
a flow channel defined within said substrate;
a sensor unit connected to said flow channel for determining a property of a fluid in said flow channel;
a valve unit for regulating fluid flow through said flow channel, comprising a valve chamber defined within said substrate, and comprising a valve member that is movably arranged within the valve chamber such that a fluid flow through said flow channel can be regulated, wherein said flow channel has a connection channel part defined within said substrate, wherein said connection channel part is connected to said valve unit, and wherein the valve chamber is defined by a floor, a circumferential side wall, and a ceiling, and the valve chamber comprises an inlet for fluid and an outlet for fluid, wherein at least one of the inlet and the outlet is provided in the side wall of the valve chamber and is connected to the connection channel part and the valve member comprises an internal flow channel defined within said valve member, and having a first outer end that faces the floor and having a second outer end facing the side wall; and
control means connected to said valve unit and said sensor unit, and arranged for controlling said valve unit based on signals obtained by said sensor unit.

2. The fluid flow device according to claim 1, wherein at least the connection channel part extends mainly parallel to the plane defined by the substrate.

3. The fluid flow device according to claim 1, wherein the sensor unit comprises a Coriolis flow sensor and/or a thermal flow sensor.

4. The fluid flow device according to claim 1, wherein the valve member is movable in a direction mainly parallel to the side wall of the valve chamber between a closed position and an open position, wherein, in the closed position, the valve member is in contact with the floor of the valve chamber and at least part of the circumferential side wall is positioned at a distance from the valve member.

5. The fluid flow device according to claim 1, wherein both the inlet and the outlet of the valve unit are provided in the side wall of the valve chamber.

6. The fluid flow device according to claim 1, wherein the valve member further comprises a third outer end facing the side wall.

7. The fluid flow device according to claim 1, wherein the valve unit comprises a flexible flow tube element that extends between the second outer end of the internal flow channel and one of the inlet or outlet provided in the side wall of the valve chamber.

8. The fluid flow device according to claim 7, wherein the valve member is suspended in the valve chamber by means of said flexible flow tube element.

9. The fluid flow device according to claim 7, wherein the flexible flow tube element is a silicon nitride flow tube.

10. The fluid flow device according to claim 1, wherein the valve unit comprises at least one further inlet and/or outlet, wherein said at least one further inlet and/or outlet is provided in the side wall of the valve chamber.

11. The fluid flow device according to claim 1, wherein the valve chamber has a width dimension as measured in a direction parallel to the plane defined by the floor, and wherein the valve chamber has a height dimension as measured in a direction parallel to the side wall of the valve chamber, wherein the width dimension is larger than the height dimension.

12. The fluid flow device according to claim 1, wherein the system chip comprises a silicon substrate, and wherein the valve unit comprises a silicon valve member, and wherein the flow channel is a silicon nitride coated channel in the silicon substrate.

13. A method of manufacturing a system chip for a fluid flow device according to claim 1, comprising the steps of:
   providing a substrate;
   realizing the valve chamber, the valve member and the flow channel by means of partially removing substrate;
   Fluidly connecting said flow channel and said valve chamber by means of partially removing substrate.

14. The method according to claim 13, wherein the method comprises partially etching steps.

15. The method according to claim 13, comprising the subsequent steps of:
   providing a silicon substrate having a device layer, a handle layer, and a buried oxide layer;
   realizing fluidic inlets and outlets in the handle layer using an etching step, in particular deep reactive ion etching of silicon;
   creating surface channels and the valve chamber in the device layer using an etching step, in particular isotropic etching of silicon through a silicon nitride slit-pattern mask;
   creating the valve member by using an etching step, in particular by selectively etching the buried oxide layer using HF etching;
   creating a closed fluidic system by means of low pressure chemical vapor deposition of silicon nitride.

* * * * *